Patented Dec. 25, 1928.

1,696,337

UNITED STATES PATENT OFFICE.

ERNEST M. SYMMES, OF WILMINGTON, DELAWARE, ASSIGNOR TO HERCULES POWDER COMPANY, OF WILMINGTON, DELAWARE, A CORPORATION OF DELAWARE.

METHOD OF PRODUCING ABIETIC ACID ESTERS OF POLYGLYCEROL.

No Drawing. Application filed November 12, 1927. Serial No. 232,950.

My invention relates to a method of producing abietic acid esters of polyglycerols, more particularly my invention relates to the production of rosin esters of diglycerol, triglycerol and the like. My invention further relates to the esters produced according to my method.

Heretofore it has been known to produce the rosin or abietic acid ester of glycerol and such has a wide use and is generally known as "ester gum." However, the rosin or abietic acid esters of polyglycerols, as diglycerol, triglycerol, and the like, have not heretofore been known, nor has a method for their production.

In accordance with my invention, I have discovered that the rosin or abietic acid esters of polyglycerol, as for example, the rosin ester of diglycerol, diglycerol having the formula:—

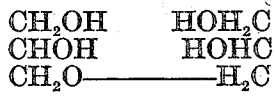

is substantially more advantageous for many purposes than are the "ester gums" heretofore produced. The polyglycerol esters, I have discovered, have a higher melting point and are harder than "ester gum" and are hence more suitable for use, for example, in varnishes and the like.

In accordance with my invention, for the production of the polyglycerol esters I treat glycerol for the purpose of effecting polymerization of two or more molecules of glycerol and the elimination of one or more molecules of water and effect the esterification of abietic acid with the resultant polyglycerol. The treatment of the glycerol may be accomplished by subjecting the glycerol to heat, preferably in the presence of a polymerization catalyst and the esterification of the abietic acid with the polyglycerol produced is effected by heating, preferably in the presence of an esterification catalyst.

In the carrying out of the method in accordance with my invention where a polymerization catalyst is used in connection with the treatment of the glycerol for the formation of a polyglycerol, I may use as a polymerization catalyst, for example, anhydrous sodium acetate, sodium hydroxide, or the like, and as an esterification catalyst in connection with the esterification of the abietic acid with polyglycerol I may use, for example, zinc dust, boric anhydride, or the like.

In carrying out the process in accordance with my invention, I may first treat the glycerol for conversion into polyglycerols and then effect esterification of rosin with the polyglycerols produced, or I may subject glycerol to treatment for conversion into polyglycerols and after a period of treatment withdraw diglycerol produced and continue the treatment for the production of higher polymers, such as triglycerol and higher. The diglycerol withdrawn and the higher polymers, as triglycerol and higher, may be separately utilized in connection with the esterification of abietic acid. Further, the polymerization of glycerol and the esterification of abietic acid to the polyglycerols may be carried out successively by treatment of a mixture including glycerol, rosin and polymerization and esterification catalysts.

As a more specific illustration of the carrying out of the method involving my invention, say 20 parts of glycerol, ½ part zinc dust and 0.1 parts anhydrous sodium acetate are heated to a temperature say within the range about 270° C. to 290° C. for a period of two hours. This heating will result in the formation of a substantial proportion of diglycerol in the mixture. After heating for two hours 100 parts of rosin are added and the mixture heated at a temperature of about 290° C. for a period of about 15 hours. On completion of the heating period excess glycerol, diglycerol and the low end rosin are removed, by heating under reduced pressure, for the recovery of the diglycerol-rosin ester formed. The diglycerol-rosin ester will have a melting point of 107° C. (drop method), 85° C. (capillary method) and an acid number of 12.

In the carrying out of the method in accordance with my invention glycerol may be polymerized by heating with 1% anhydrous sodium acetate for say about two hours at a temperature of 290° C., after which a portion consisting mainly of diglycerol is withdrawn and the remainder heated for a further period of two hours. After the further heating of the remaining portion, it will be found to comprise higher polymers, such as triglycerol or higher. The portion withdrawn, consisting mainly of diglycerol, in the amount of 20 parts, may then be mixed with 100 parts of rosin and 1 part of zinc dust and heated for about 6 hours at a temperature of about 285° C. to effect esterification of the rosin. The diglycerol rosin ester recovered will be found to have an acid number of 20 and a melting point of 90° C. (drop method) and 73° C. (capillary method). The triglycerol may be similarly mixed with rosin and zinc dust and heated for the production of triglycerol rosin ester, which will be found to have an acid number of 20 and a melting point of 93° C. (drop method) and 75° C. (capillary method).

In effecting and esterification of the rosin and polyglycerol, it is preferred that the mixture of polyglycerol, rosin and zinc dust be refluxed, any suitable apparatus being used.

It will be observed that in accordance with my invention I subject glycerol to polymerization and effect the esterification of abietic acid with a polyglycerol or polyglycerols resulting from the polymerization. In effecting the polymerization and esterification treatments, I preferably utilize catalysts in order to decrease the time required for carrying out the treatments. It will be understood that the polymerization of glycerol and the esterification of the abietic acid may be carried out separately or successively by a single treatment of a mixture of glycerol and abietic acid. It will be further understood that in accordance with my invention I may produce the ester of a polyglycerol or an ester resulting from the treatment of abietic acid with a mixture of polyglycerols, as diglycerol, triglycerol and even higher polymerization products. It will be understood that in the process according to my invention abietic acid in the pure state may be used or I may use rosin, as for example, wood rosin. It will be noted that in accordance with my invention rosin esters of polyglycerol, such as the abietic acid and rosin esters of diglycerol and the abietic acid and rosin esters of triglycerol, not heretofore known, are produced.

It will be understood that where herein reference is made to abietic acid, I contemplate the substantially pure acids or rosins containing the acid.

Having now fully described my invention, what I claim and desire to protect by Letters Patent is:—

1. As a new composition of matter, the abietic acid ester of a polyglycerol.

2. As a new composition of matter, the abietic acid ester of diglycerol.

3. As a new composition of matter the rosin ester of diglycerol.

4. The method of producing the abietic acid ester of a polyglycerol, which includes polymerizing glycerol and esterfying abietic acid by the addition thereof to the polymerized glycerol.

5. The method of producing the abietic acid ester of a polyglycerol, which includes subjecting glycerol to heat in the presence of a polymerization catalyst and esterfying abietic acid by the addition thereof to the polymerized glycerol.

6. The method of producing the abietic acid ester of a plyglycerol, which includes subjecting glycerol and abietic acid to heat to effect polymerization of gylcerol and esterification of abietic acid with the polymerized glycerol.

7. The method of producing the abietic acid ester of a polyglycerol, which includes subjecting glycerol and abietic acid to heat in the presence of a polymerizing catalyst to effect polymerization of glycerol and esterification of abietic acid with the polymerized glycerol.

8. The method of producing the abietic acid ester of a polyglycerol, which includes subjecting glycerol and abietic acid to heat in the presence of zinc dust and sodium acetate to effect polymerization of glycerol and esterification of abietic acid with the polymerized glycerol.

9. The method of producing the abietic acid ester of a polyglycerol, which includes subjecting glycerol and abietic acid to heat in the presence of a polymerizing catalyst to effect polymerization of glycerol and esterification of abietic acid with the polymerized glycerol and heating under reduced pressure for the recovery of the polyglycerol rosin ester.

10. The method of producing the abietic acid ester of a polyglycerol, which includes subjecting glycerol to a temperature within the range about 270° C.–290° C. for a period of about two hours, in the presence of a catalyst which will promote polymerization, adding rosin and subjecting the mixture to a temperature of about 290° C. for a period of about fifteen hours and removing from the polyglycerol ester produced excess glycerol, polyglycerol and low end rosin.

11. The method of producing the abietic acid ester of a polyglycerol, which includes refluxing rosin, a polyglycerol and an esterification catalyst and recovering the rosin ester formed.

12. The method of producing the abietic acid ester of a polygylcerol, which includes refluxing a polyglycerol, rosin and zinc dust and recovering the rosin ester formed.

13. The method of producing the abietic acid ester of a polyglycerol, which includes refluxing diglycerol, rosin and zinc dust and recovering the rosin ester formed.

14. The method of producing the abietic acid ester of a polyglycerol, which includes refluxing a polyglycerol, rosin and zinc dust at a temperature of about 285° C. for a period of about six hours and recovering the rosin ester formed.

In testimony of which invention, I have hereunto set my hand, at Philadelphia, Pennsylvania, on this 9th day of November, 1927.

ERNEST M. SYMMES.